United States Patent
Stern et al.

(10) Patent No.: US 10,043,187 B2
(45) Date of Patent: Aug. 7, 2018

(54) SYSTEM AND METHOD FOR AUTOMATED ROOT CAUSE INVESTIGATION

(71) Applicant: NICE Ltd., Ra'anana (IL)

(72) Inventors: Jeffrey Alan Stern, Tel Aviv (IL); Nimrod Cohen, Raanana (IL)

(73) Assignee: NICE LTD., Ra'anana (IL)

(*) Notice: Subject to any disclaimer, the term of this patent is extended or adjusted under 35 U.S.C. 154(b) by 193 days.

(21) Appl. No.: 15/190,215

(22) Filed: Jun. 23, 2016

(65) Prior Publication Data

US 2017/0372323 A1  Dec. 28, 2017

(51) Int. Cl.
*G06F 17/30* (2006.01)
*G06Q 30/00* (2012.01)
*H04M 3/523* (2006.01)

(52) U.S. Cl.
CPC ..... *G06Q 30/016* (2013.01); *G06F 17/30551* (2013.01); *G06F 17/30684* (2013.01); *G06F 17/30707* (2013.01); *H04M 3/5235* (2013.01)

(58) Field of Classification Search
CPC ............ G06Q 30/016; G06F 17/30551; G06F 17/30684; G06F 17/30707; H04M 3/5235

USPC ...................................................... 379/266.02
See application file for complete search history.

(56) References Cited

U.S. PATENT DOCUMENTS

| | | | |
|---|---|---|---|
| 8,606,810 B2* | 12/2013 | Ando | G06F 17/30684 707/769 |
| 2006/0085405 A1* | 4/2006 | Hsu | G06F 17/30011 |
| 2014/0019445 A1* | 1/2014 | Iwasaki | G06F 17/2775 707/725 |
| 2016/0154797 A1* | 6/2016 | Kern | G06F 17/3053 707/730 |

* cited by examiner

Primary Examiner — Ahmad F Matar
Assistant Examiner — Jirapon Intavong
(74) Attorney, Agent, or Firm — Pearl Cohen Zedek Latzer Baratz LLP

(57) ABSTRACT

A system and method for investigating an issue may include defining a set of phrase categories; associating each of a set of recorded interactions with at least one phrase category; receiving a selection of a first time interval and a second time interval; selecting a reference phrase category; calculating, for at least some of the phrase categories in the set of phrase categories a correlation differential based on a trend of the phrase category and a trend of the reference phrase category and, if a correlation differential of a category is larger than a threshold then including the category in the reference category.

21 Claims, 6 Drawing Sheets

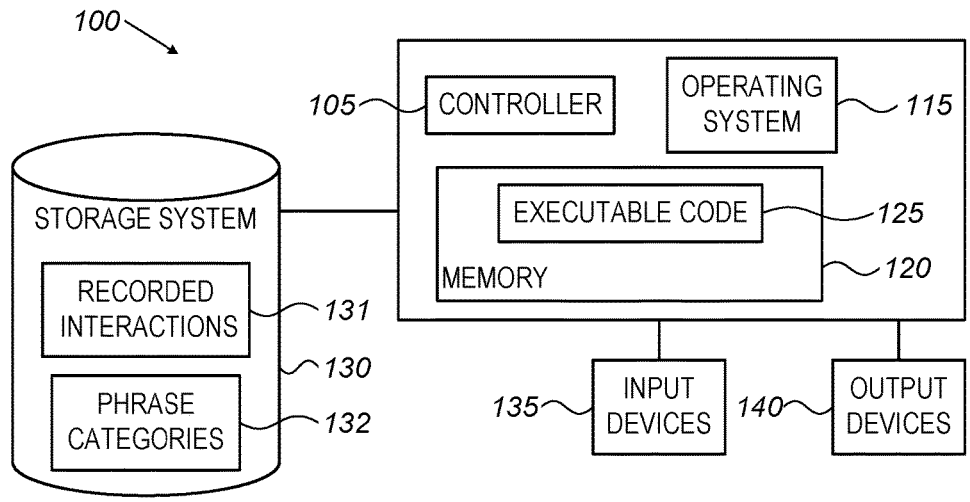
FIG. 1
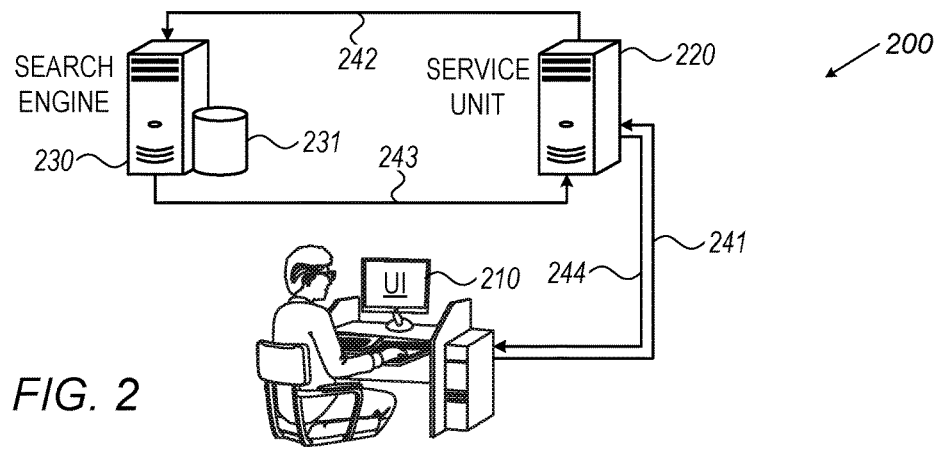
FIG. 2
FIG. 3
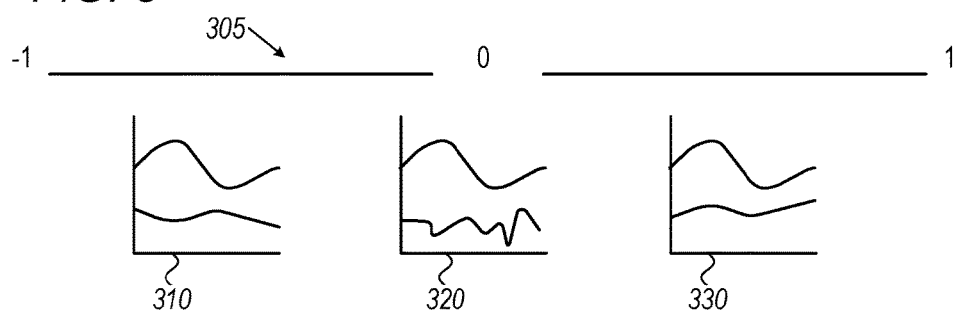

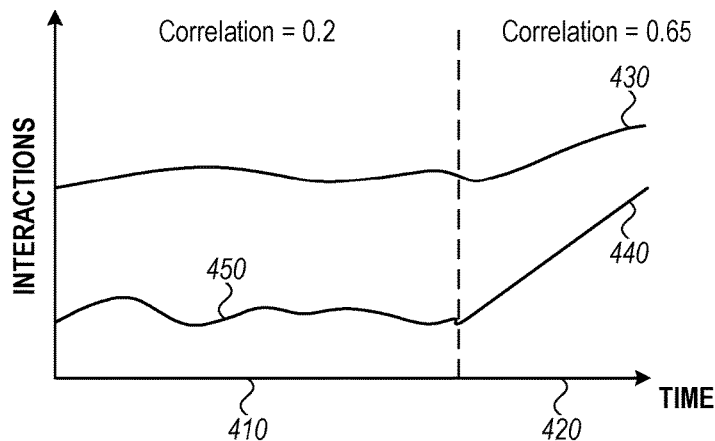
FIG. 4
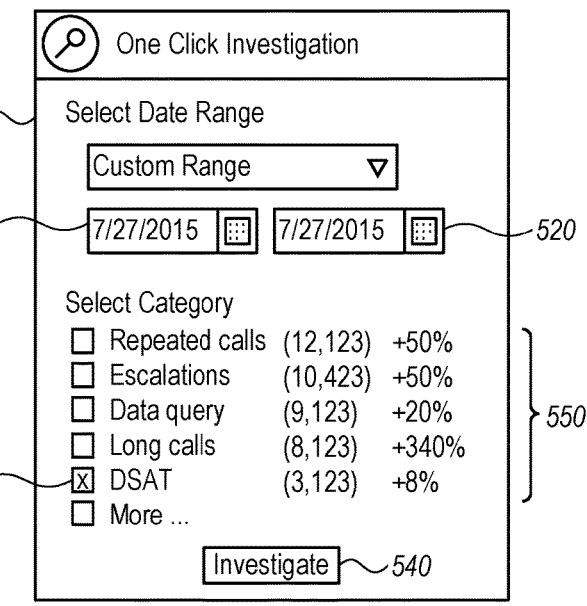
FIG. 5
FIG. 6
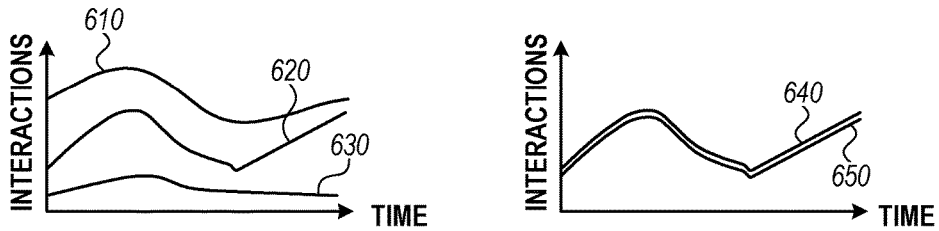

SYSTEM AND METHOD FOR AUTOMATED ROOT CAUSE INVESTIGATION

FIELD OF THE INVENTION

The present invention relates generally to an automated investigation of a problem. More specifically, the present invention relates to an automated system and method for identifying a root cause of an issue based on recorded interactions.

BACKGROUND OF THE INVENTION

Contact (or call) centers where groups of service representatives interact with users or customers, for example by telephone but also by other communications methods, are known in the art. Generally, agents (e.g., human employees, but sometimes automated "bots") in a contact center interact with, or talk to, customers or clients in order to sell products or services and/or solve issues or problems related to products or services. For example, a customer who has a problem or issue with a product or service calls (e.g., via telephone or other voice communications channels) a call center and discusses the issue with an agent. An interaction may be for example a conversational exchange between one or more people, e.g. a verbal conversation, a conversation via e-mail, or a conversation via text or other messages. Such interactions may be recorded, e.g., by audio recording, recordings of texts, etc. Recorded interactions may be transcribed such that a textual representation of interactions is produced. For example, a transcription of a recording of a conversation between an agent and a customer may enable searching for words or phrases mentioned in the conversation.

Identifying and/or characterizing, in a contact center, problems and/or issues that customers have with products and services is a challenge not yet fully met by the industry. For example, known system and methods do not offer an automated way of determining which products or services customers complain about. Moreover, known system and methods do not offer an automated way of determining, identifying or pinpointing the specific problem or issue related to a product or service.

Currently, human analysts in a contact center perform analysis of interactions, e.g., by listening to recorded interactions, examining transcriptions of interactions and so on. In other cases, analysis is performed, by a system, based on transcriptions of calls. However, known systems and methods suffer from a number of drawbacks. For example, known systems and methods rely on speech to text (STT) transformations of calls (known in the art as transcriptions) which typically include errors. In addition, known systems and methods are time consuming and require highly skilled (and costly) human professionals.

SUMMARY OF THE INVENTION

A system and method for investigating an issue may include defining a set of phrase categories; associating each of a set of recorded interactions with at least one phrase category; receiving a selection of a first time period or interval and a second time period or interval; selecting a reference phrase category; calculating, for at least some of the phrase categories in the set of phrase categories a correlation differential based on a trend of the phrase category and a trend of the reference phrase category and, if a correlation differential of a category is larger than a threshold then including the category in the reference category. A reference category may include phrases that identify, specify or indicate a cause (or root cause) of a problem.

An embodiment may define a set of phrase categories for example by including one or more phrases in each of the phrase categories; associate each of a set of recorded interactions with at least one phrase category in the set of phrase categories, wherein a recorded interaction is associated with a phrase category if the recorded interaction includes at least one phrase included in the phrase category; receive a selection of a first time interval and of a second time interval, the first time interval preceding the second time interval; select a reference phrase category; a. calculate, for each of at least some of the phrase categories in the set of phrase categories a correlation differential by: calculating, for the first time interval, a first correlation value for the phrase category and the reference phrase category, the first correlation value representing the correlation of a trend of the phrase category with a trend of the reference phrase category, wherein a trend of a phrase category is defined by a set of values representing the number of recorded interactions, in a respective set of time units, that are associated with the phrase category; calculating, for the second time interval, a second correlation value for the phrase category and the reference phrase category, and calculating the correlation differential of the phrase category by subtracting the second correlation value from the first correlation value; b. select a candidate phrase category by identifying the phrase category with the highest correlation differential and denoting the correlation differential of the candidate phrase category as the candidate correlation differential; c. for each phrase category with a negative correlation differential: removing the phrase category from the set of phrase categories by removing recorded interactions associated with the phrase category from the set of recorded interactions; calculating an updated candidate correlation value for the candidate phrase category and the reference phrase category, and if the difference between the candidate correlation value and the updated candidate correlation value is below a threshold then returning the phrase category to the set of phrase categories by returning the recorded interactions that were removed at step (a) to the set of recorded interactions; and if the difference between the candidate correlation value and the updated candidate correlation value is above a threshold then adding at least one of the phrases included in the candidate phrase category to a root cause list of phrases. As used and referred to in the art, a root cause is the actual cause of a phenomena, issue or problem. As referred to herein, a root cause list of phrases may be a list or set of phrases that specifically indicate, explain or represent an issue or problem. For example, if the main problem with a smartphone is that the phone's battery drains quickly then a root cause list of phrases may be "battery", "drains fast", "recharge often" and the like.

An embodiment may select the candidate phrase category by identifying the phrase category with the highest correlation differential value and whose trend changed, in the second time interval with respect to the first time interval, in the same direction of a change of the trend of the reference phrase category.

If the correlation differential value of the reference phrase category and the candidate phrase category is above a threshold then an embodiment may produce a combined phrase category by combining the candidate phrase category and the reference phrase category, denoting the combined phrase category as the reference phrase category and repeating steps b and c.

An embodiment may select a phrase from the combined phrase category; generate a phrase trend for the phrase based on the number of recorded interactions, in the set of recorded interactions, that include the phrase, per time unit, during the second time interval; generate a combined phrase category trend for the combined phrase category; determine a correlation level by relating the phrase trend to the combined phrase category trend; and if the correlation level is greater than a threshold level then an embodiment may include the phrase in a root cause list of phrases and providing the list to a user.

An embodiment may, for each phrase category in the combined phrase category: for each phrase in the category: if a correlation of the phrase trend of the phrase with a trend of the phrase category is greater than the correlation of the phrase trend with a trend of the combined phrase category then remove the phrase category from the combined phrase category.

An embodiment may, for at least one phrase included in the root cause list of phrases: calculate a phrase correlation differential based on a trend of the phrase and a trend of the combined phrase category; and if the correlation differential is less than a threshold level then removing the phrase from the root cause list of phrases. An embodiment may select a reference phrase category based on input from a user; and provide, with respect to the input, at least one of: a list of interactions, a number of interactions, a list of related categories and a list of related phrases. A recorded interaction may be associated with a phrase category if at least one phrase included in the phrase category is included in the recorded interaction.

A recorded interaction may be one of: an audio recording of an interaction, a video recording of an interaction, a recording of a textual interaction and a transcript of an interaction. A recorded interaction may be associated with a phrase category based on metadata related to the recorded interaction.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 1 shows high level block diagram of an exemplary computing device according to illustrative embodiments of the present invention;

FIG. 2 shows a system and flows according to illustrative embodiments of the present invention;

FIG. 3 graphically shows exemplary trends according to illustrative embodiments of the present invention;

FIG. 4 graphically shows exemplary trends according to illustrative embodiments of the present invention;

FIG. 5 shows a screenshot according to illustrative embodiments of the present invention;

FIG. 6 graphically shows exemplary trends according to illustrative embodiments of the present invention;

Figure 7:
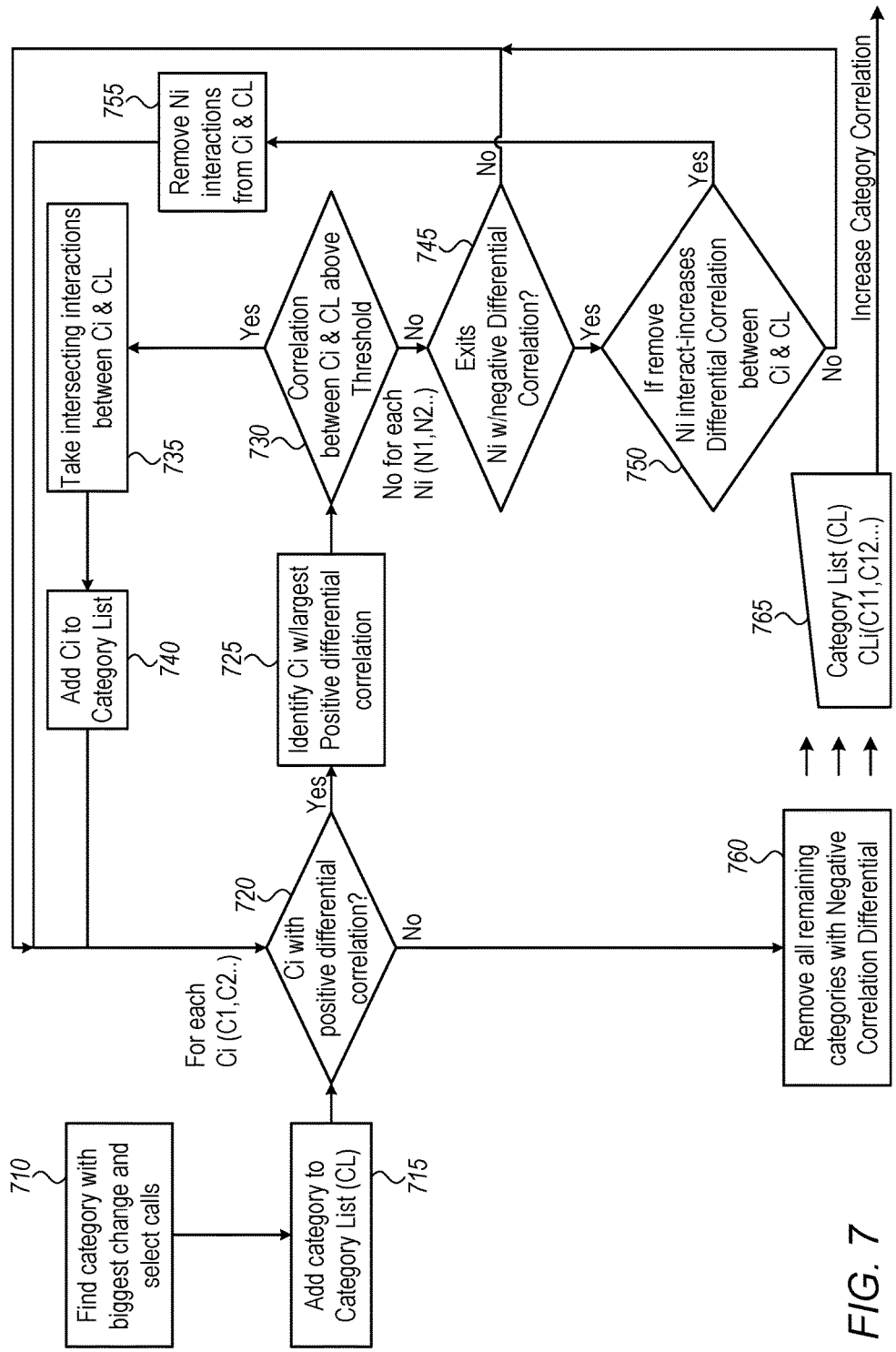
FIG. 7 shows a flow according to illustrative embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, executable code 125, a storage system 130 that may include recorded interactions 131 and phrase categories 132 as shown, input devices 135 and output devices 140. Controller 105 (or one or more controllers or processors, possibly across multiple units or devices) may be configured to carry out methods described herein, and/or to execute or act as the various modules, units, etc. More than one computing device 100 may be included, and one or more computing devices 100 may act as the various components, for example the components shown in FIG. 2, e.g., service unit 220 and search engine 230 described herein may be, or may include components of, computing device 100. For example, by executing executable code 125 stored in memory 120, controller 105 may be configured to carry out a method of one click investigation as described herein. For example, controller 105 may be configured to carry out a method that, based on recorded interactions, identifies an issue or problem and a root cause of the problem or issue as described herein.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that generates, updates and uses phrase categories as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein (e.g., service unit 220) may be, or may include, controller 105, memory 120 and executable code 125.

Storage system 130 may be or may include, for example, a hard disk drive, an array of hard drives, a Compact Disk (CD) drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. For example, system 200 described herein may include three controllers 105, e.g., included in service unit 220, search engine 230 user interface (UI) unit 210 as described with reference to FIG. 2.

A system according to some embodiments of the invention may additionally include other suitable hardware components and/or software components. In some embodiments, a system may include or may be, for example, one or more personal computers, desktop computers, laptop computers, workstations, server computers, network devices, or any other suitable computing devices. For example, a system as described herein may include one or more devices such as computing device 100.

The term phrase as referred to herein may be, or may relate to, one or more words, e.g., "bill" and "close my account" are phrases. The term "phrase category" (or simply category) as referred to herein may mean, or refer to, a set, group or number of phrases, terms or words. A category, or a phrase category, may be, or may include, one or more phrases. A phrase category may be a set of phrases, e.g., in the form of text, included in a file and stored in a database or other storage system. For example, phrase categories 132 may be files or other objects that include phrases as described. For example, a "billing" category may be defined (e.g., by a user) and may include the phrases "check my bill", "bill me now" and "do not bill me". A phrase category may have a name or label, such that there is a billing category, a delivery category (e.g., including phrases such as "send by overnight", "no signature needed" and the like).

The term recorded interaction as referred to herein may be, or may relate to, any recordation of an interaction, e.g., a telephone call between a customer and an agent in a contact center, a web session in which a customer interacts with a website, an exchange of text messages and the like. The term recorded interaction as referred to herein may be, or may relate to, a transcription of a recorded interaction, e.g., produced using known in the art STT techniques and systems. Where applicable, the terms recorded interactions and transcription may refer to, or mean, the same thing and may be used interchangeably herein. For example, recorded interactions 131 included in storage system 130 may be recorded telephone calls, transcriptions of telephone call and so on.

Reference is made to FIG. 2, an overview of a system 200 and flows according to some embodiments of the present invention. As shown, a system may include a UI unit 210, a service unit 220 and a search engine 230 operatively connected to a storage system 231.

UI unit 210 may be any suitable device adapted to provide UI, e.g., a computer or smartphone that may include a desktop application that provides user interface, or a web browser that provides a web-based interface. UI unit 210 may be adapted to receive queries, preferences, selections and other input from a user and present results or other information to a user. For example, UI unit 210, may enable a user to define and/or create (e.g., by receiving input from a user as described) phrase categories for example by selecting a name or label of a category and selecting or inputting phrases to be included in the category. Categories may be stored, e.g., as list of phrases, in a database, e.g., as shown by phrase categories 132 in FIG. 1. As described herein, using UI unit 210 a user may launch a one-click investigation of a problem or issue. UI unit 210 may include a display, screen or monitor as known in the art, accordingly, presenting information to a user as described herein may mean presenting the information on a display, screen or monitor that is operatively connected to UI unit 210. Receiving input, selection or any other data or indication from a user as described herein may be done using a keyboard and mouse that may be operatively connected to UI unit 210.

Service unit 220 may receive requests, selections and/or commands from UI unit 210, send requests or commands to search engine 230, receive responses from search engine 230, process the responses, generate results based on the responses and may send data for presentation to a user to UI unit 210 as further described herein. Service unit 220 may provide an interface to search engine 230, and may use search engine 230 or cause search engine 230 to operate, e.g., in order to search for terms or phrases in recorded interactions stored in storage system 231, list number of recorded interactions, per time period or interval, that include a phrase and so on.

Search engine 230 may be any suitable search platform and may be, or include, one or more computing devices similar to computing device 100. Search engine 230 may be, or may include, any suitable computers, servers or services. For example, search engine 230 may be, or may include the Solr search engine as known in the art.

Storage system 231 may be, or may include, storage system 130. In some embodiments of the invention, storage system 231 may include a database that includes, or is used for storing, recorded interactions. Storage system 231 may be, or may include, any platform or system useable for archiving recorded interactions.

As shown by arrow 241, UI unit 210 may send, to service unit 220, data, commands, requests or any other information. For example, UI unit 210 may send to service unit 220 a base or reference category (or phrase category) that may be used for an investigation as described herein. As shown by arrow 242, service unit 220 may send, to search engine 230, data, commands, requests or any other information. For example, service unit 220 may send, to search engine 230 queries as described herein. As shown by arrow 243, search engine 230 may send, to service unit 220, data, commands, requests or any other information. For example, search engine 230 may return responses to service unit 220 as described herein. As shown by arrow 244, service unit 220 send, to UI unit 210, data, commands, requests or any other information. For example, service unit 220 send, to UI unit 210, a list of root cause phrases that specifically describes a problem as further described herein.

An interaction as referred to herein may be a telephone call or conversation, e.g., between an agent in a contact center and a caller or any other a verbal conversation, e.g., a recording of a conversation of people sitting in a room and talking. An interaction may be an exchange of electronic mail, text messages or an exchange of information between a person and an application, e.g., an interaction with a website that includes providing input (e.g., feedback from a user, filling out forms, answering an online questionnaire and so on.

Recorded interactions archived, included or stored in, storage system 231 may be any recordings of interactions, e.g., voice or audio recordings, recording of textual interactions (e.g., a recording of text messages exchanged between a customer and agent or between a user and a website or application), video recordings, audio recordings of a telephone call and/or recordings of a chat session.

Recorded interactions may be, or may include, transcriptions of recorded interactions, e.g., as produced using known in the art SST techniques and systems. For example, a recorded interaction may be (or may be stored in) a file that includes text of a textual interaction, data usable by a system to replay a conversation or any other information that may be captured and stored with respect to an interaction, e.g., an interaction of an agent with a caller or customer, an interaction of a customer with a web application and the like. Where and when required, recorded interactions may be transformed into a textual representation (e.g., using known in the art SST systems or techniques). Where and when required, recorded interactions may be transformed into a textual representation (e.g., using known in the art SST systems or techniques). For the sake of simplicity and clarity, recorded interactions as referred to herein may be transcriptions of recorded interactions, accordingly, phrases, words and terms may be readily searched for (e.g., by search engine 230) in recorded interactions stored in a database (e.g., in storage system 231).

Search engine 230 may be adapted to deal with a large number of queries over what could be hundreds thousands of recorded interactions in storage system 231. Search engine 230 may be adapted to perform many comparison, aggregations and calculations that have to be accomplished with in a very short period of time. For this reason, the latest in textual search engines may be included in system 200 (e.g. the Solr or Elastic search platforms known in the art).

Search engine 230 may be adapted to perform facet functionality as known in the art. Search engine 230 may be adapted to preform extremely fast queries that can identify text tokens in milliseconds. Using the Solr cloud known in the art, system 200 may be a distributed system that can scale up by just adding machines and memory and by dividing data to smaller ranges or groups, e.g., into sets of recorded interactions. The term "faceting" as referred to herein relates to arrangement of search results into categories based on indexed terms. In some embodiments, users or searchers are provided and/or presented with the searched terms, along with numerical counts of how many matching documents were found for each term, per time period or interval. For example, when providing facet functionality or facet service, search engine 230 may receive a query in the form of a phrase or set of phrases, and return the number of recorded interactions, stored in storage system 231, that include the phrase or set of phrases, per time period or interval.

In some embodiments, a recorded interaction may be associated with a category (or with a phrase category, or with a category of phrases), with a phrase, with a term or with a word if the interaction includes at least one word, term or phrase included in the category or phrase. For example, if a category includes the words "dog" and "cat" then both a first interaction that includes the word "cat" and a second interaction that includes the word "dog" may be associated with the category. Associating recorded interactions with categories, phrases, terms or words may include, or be achieved or done by examining, by a computing device as described, a textual representations of the recorded interactions and searching, in the textual representations, phrases, terms or words that are included in a category or phrase. For example, a list or table may be used in order to reference, or point to, interactions that include a phrase included in a category such that the interactions are associated with the category. For example, a list, table or other known structures or objects may be used to associate or link recorded interactions to a category or phrase such that given a category, all interactions that are associated with, or linked to, the category may be readily identified, found and/or obtained. Accordingly, associating a set of recorded interactions stored in a database with a category may enable finding, in the database, all of the recorded interactions that are associated with the category.

Recorded interaction may be associated with a category phrase, term or a word based on metadata related to the recorded interaction. For example, a recorded interaction may be associated with metadata such as a word based on notes created and stored (e.g., in a separate file), with relation to the interaction. For example, an agent may write a summary of a conversation that described the issues raised in the conversation and the summary may be stored in association with the recording of the call, e.g., as known in the art, a database or a customer relationship management (CRM) may store a number of files that are associated or linked and, using a name or reference of one file, other, associated or linked files, may be found and retrieved. Other examples of metadata may be a date of the call, a name of an agent etc., all of which may be stored, e.g., in storage system 231. For example, when searching for, or in, recorded interactions, e.g., in order to provide responses as described, search engine 230 may use any metadata related to recorded interactions and may provide responses based on metadata. For example, a response to a query that includes "bill" as described below may include recorded interactions that include the word "bill" in metadata that is associated with the recording of the interaction.

In some embodiments, an association of recorded interactions with a category of phrases (also referred to herein as a phrase category or simply a category) may be a list or other construct that identifies, or points to, recorded interactions that are associated with the category. For example, a list, table or pointers as known in the art may be used in order to record or indicate that a set of interactions is associated with a category. For example, an association of recorded interactions with a category may be a list of all recorded interactions (e.g., a list of file names or other reference) that are associated with the category. An interaction (or a recorded interaction) may be associated with a category (or phrase category) if at least one of the phrases included in the category is present and/or detected in the interaction or recorded interaction.

A trend as referred to herein may be a set of values, a plot, a curve or graph that represents a frequency or count, or a change in a frequency and count, with respect to or over time. For example, a trend may include values over time. A trend may show the change over time of a value or occurrence. In some embodiments, a trend of (or for) a phrase, word or category may be, may include or may be defined by, a set of values representing the number of recorded interactions that are associated with the phrase, word or category and that occurred (or were recorded) in a respective set of time units. For example, if 3 interactions that occurred on a first day include the phrase "cancel my order", 6 interactions that occurred (or were recorded) on a second (following) day include this phrase and 4 interactions that took place on the third day include the phrase then a trend for the phrase "cancel my order" for the three days will be, will include, or will be defined by, the set of values 3, 6, 4. Of course, a trend may be defined for any time unit or time resolution, e.g., hours, minutes or months. As known in the art, the time on which an interaction took place (or was recorded) can readily be determined by search engine 230.

For example, a trend of, or for, a phrase, or a trend for a category of two or more phrases, for a given time period or interval, may be calculated or generated by counting, identifying or determining, for each day, hour, minute or any time unit of any resolution, all recorded interactions that include the phrase (or phrases of a category of phrases) and saving, per day, hour, minute or any other time unit or resolution, the number of recorded interactions that include the phrase. For example, a trend for the phrase "check my account" for three days may be the set values: 145, 687 and 122, showing a rise, in the second day, in calls in which the phrase "check my account" was mentioned or discussed. A trend for a category of phrases (or phrase category) may be generated or defined by counting, identifying or determining, for each time resolution unit, all recorded interactions that include at least one phrase included in the category of phrases (or in the phrase category). A trend for a phrase category, or for a set of phrases, may be generated by counting, per each time unit, the number of recorded interactions that include at least one of the phrases in the phrase category or in the set of phrases. Accordingly, an embodiment may generate or calculate a trend for a single phrase or for a category or set of phrases as described.

A trend may be calculated or generated for interactions. For example, a trend for interactions (or interactions trend) may represent the total, aggregated or cumulative, number of interactions, per time period, unit or interval, irrespective of phrases in the interactions. For example, an interaction trend for a time period or interval may be the total number of all interactions (e.g., archived or stored in storage system 231) per time unit. For example, an interaction trend for three days may be the set values: 345, 327 and 592, showing a rise in the total number of interactions or calls in the third day. Trends of categories may be correlated with an interaction trend. For example, if the above exemplary interaction trend (345, 327 and 592) and phrase trend (45, 687, 122) are for the same three days then an embodiment may determine that the trends do not correlate, e.g., since the interaction trend sharply rises, or goes up, on the third day (and no significant change is seen in the phrase trend on the third day) and the phrase trend sharply rises, or goes up, on the second day while the interaction trend is steady on the second day. According to some embodiments, if two trends rise and fall (e.g. indicate a rise and fall), over the same time units or intervals, then they may be determined to be, or identified as, correlated. According to a similar logic, if two trends do not rise and fall together or the same way, over the same time units, then a system and method according to some embodiments of the invention may determine them to be, or identify them as, uncorrelated. Using a similar logic, if a first trend typically rises or goes up when a second trend falls or goes down then the trends may be considered by some embodiments of the invention as having a negative correlation. As described herein, the correlation of trends may be quantified and/or represented by a value that may indicate a correlation, no correlation or negative (e.g., inverse) correlation.

A trend may be generated using facet functionality that may be provided for example by search engine 230. For example, in response to a request that indicates a phrase and a time interval, search engine 230 may return the number of recorded interactions that that include the phrase and that were recorded (or occurred or took place) in the time interval. Using metadata associated with recorded interaction as known in the art (e.g., a timestamp associated with a recording of an interaction), search engine 230 may determine, for each recorded interaction stored in storage system 231, the time the interaction took place. Accordingly, search engine 230 may provide, for a given or requested time interval, the number of interactions that took place in each time slot over, or in, the time interval.

Below is example of a request that may be sent, by service unit 220 to search engine 230 and of a response returned by search engine 230. As shown, a request for the number of interactions that include the phrase "bill" ("q":"bill"), on each day ("facet.range.gap":"+1DAYS"), starting Jan. 1, 2014 ("facet.range.start":"2014-01-01T00:00:00Z"), until Jan. 1, 2016 ("facet.range.end":"2016-01-01T00:00:00Z") may be sent. Other specific code, other data structures, and other languages, may be used.

```
{
  "responseHeader":{
    "status":0,
    "QTime":15,
    "params":{
      "facet":["true",
        "true"],
      "indent":"true",
      "q":"bill",
      "facet.range.start":"2014-01-01T00:00:00Z",
      "facet.range":"contactGMTStartTime_dt",
      "facet.range.end":"2016-01-01T00:00:00Z",
      "facet.range.gap":"+1DAYS",
      "f.contactGMTStartTime_dt.facet.mincount":"1",
      "wt":"json",
      "rows":"0"}},
  "response":{"numFound":7842, "start":0, "maxScore":31.466272,
  "docs":[ ]
  },
  "facet_counts":{
    "facet_queries":{ },
    "facet_fields":{ },
    "facet_dates":{ },
    "facet_ranges":{
      "contactGMTStartTime_dt":{
        "counts":[
          "2014-04-28T00:00:00Z",35,
          "2014-04-29T00:00:00Z",84,
          "2014-04-30T00:00:00Z",106,
          "2014-05-01T00:00:00Z",90,
          "2014-05-02T00:00:00Z",85,
          "2014-05-03T00:00:00Z",43,
          "2014-05-04T00:00:00Z",45,
          "2015-03-04T00:00:00Z",44,
          ...... .
          "2015-04-27T00:00:00Z",455],
        "gap":"+1DAYS",
        "start":"2014-01-01T00:00:00Z",
        "end":"2016-01-01T00:00:00Z"}}}}
```

As shown, the example response may include an array of pairs, each one having a date and the number of interactions on that date, e.g., 35 interactions on Apr. 28, 2014 ("2014-04-28T00:00:00Z",35), 84 interactions on Apr. 29, 2014, 106 interactions on Apr. 30, 2014 and so on. As can be seen by "QTime":15" the above exemplary query took 15 MS to execute on a Solr system. Service unit 220 may generate a trend based on the above response, e.g., a trend for April 29$^{th}$ until May 4$^{th}$ with the values of 84, 106, 90, 85, 43, 45. Accordingly, trends for any phrase or set or category of phrases, for any time interval may be generated by an embodiments of the invention and may be used as further described herein.

A correlation between trends may be calculated, identified, determined or quantified. For example, a correlation between trends may be calculated, identified, determined or quantified using values (x and y) of the two trend using Formula 1 below:

$$R(X, Y) = \frac{\sum (x - \bar{x})(y - \bar{y})}{\sqrt{\sum (x - \bar{x})^1 \sum (y - \bar{y})^2}} \qquad \text{Formula 1}$$

Where X and Y are values of two trends during a time period and $\bar{x}$ and $\bar{y}$ are the sample means averages of X and Y. Other suitable formulas may be used in order or calculate or quantify a level of correlation between trends.

Accordingly, if the value of R(X,Y) is close to "+1", then the correlation level or value is high and it indicates a strong positive correlation (or that the trends represented by the X and Y values in Formula 1 are highly correlated), and if the value of R(X,Y) is close to "−4", (the correlation level or value is low or small) and it indicates a strong negative correlation, that is, the trends are uncorrelated, e.g., when one trend goes up along a timeline, the other trend goes down. Other ranges for correlation values may be used (e.g., percentages, −100 to 100, etc.).

The level or degree of a correlation between, or of, trends may be determined or identified, by some embodiments of the invention, based on a correlation value calculated as described. For example, a value of, or close to, one ("1") may indicate, and may be used by some embodiments to determine or identify, a strong correlation between trends, similarly, a value of, or close to, minus one ("−1") may indicate, and may be used by some embodiments of the invention to determine or identify, a negative or inverse correlation between trends, e.g., the trends change in opposite directions along a time line or the trends behave in an inverse manner. A value of, or close to, zero ("0") may indicate, and may be used by some embodiments of the invention to determine or identify, that the trends are in no way correlated. In some embodiments, regardless of whether the correlation value approaches zero ("0") from a negative or positive direction, a decrease in the correlation value is interpreted as a decrease of, or less, correlation between the trends and a value of zero ("0") may mean (and cause an embodiment to determine) that the trends are uncorrelated.

It will be understood that a correlation value of trends may be calculated for phrase trends and/or category trends. For example, a correlation level or value for, of, or between a category of phrases and a specific phrase may be calculated as described herein, e.g., a first trend, for the category, may be generated, a second trend, for the specific phrase, may be calculated, and a correlation between the first and second trends may be quantified as described herein, e.g., using Formula 1.

Reference is made to FIG. 3 which graphically shows exemplary trends and correlation values according to illustrative embodiments of the present invention. As shown by graphs 310, if, along a timeline, a first and a second trend behave or change in an inverse manner or way then the correlation value that may be calculated using Formula 1 is close to minus one ("−1") as indicated by correlation value 305. As shown by graphs 320, if no correlation, along a timeline, between a first and second trend exists then the correlation value for the two trends may be around or close to zero ("0"). As shown by graphs 330, the stronger the correlation between, or of, two trends, the closer is the correlation value 305 to one ("1").

A correlation differential value may be calculated, determined or quantified by some embodiments of the invention. A correlation differential value may be the difference between a correlation value calculated for two trends for a first time interval and the correlation value calculated for the same two trends for a second time interval or period. Otherwise described, a correlation differential may be the delta or difference between two correlation values calculated for two time periods. A correlation differential may be calculated, determined or quantified for any two, or pair of, trends, e.g., for two trends calculated for two phrases, two phrase categories, or for a trend of a phrase and a trend of a category. A correlation differential value may be calculated, determined or quantified based on a first and second time intervals selected by a user.

Reference is made to FIG. 4 which graphically shows exemplary trends and correlation values according to illustrative embodiments of the present invention. As shown, a correlation value calculated for trends 430 and 440 over time interval 410 may be for example 0.2. As can be seen, during time interval 410, trends 430 and 440 are not synchronized or highly correlated, for example, when trend 440 goes down as shown by point 450, trend 430 slightly goes up. As shown, during time interval 420, trends 430 and 440 are more correlated than during time interval 410 (e.g., both go up at the same time) and accordingly, the correlation value calculated by an embodiment for time interval 420 may be higher than the one calculated for time interval 410, e.g., 0.65 as shown. Using a first correlation value of 0.2 and a second correlation value of 0.65, the correlation differential value for trends 430 and 440 with respect to timer intervals 410 and 420 may be calculated by an embodiment by subtracting the first correlation value from the second one, e.g., 0.65−0.2=0.45. For the sake of simplicity and clarity, a correlation differential value calculated for two trends with respect to a first and second time intervals (e.g., as described herein with respect to FIG. 4) may be referred to herein as the correlation differential value of the trends over a first and second time intervals or simply the correlation differential value of the trends.

Embodiments of the invention may enable determining what is happening, e.g., in a contact center. For example, an embodiment may enable a supervisor or other user in a contact to determine, or find out, that callers or customers are complaining about a product, are dissatisfied with a service and so on. Embodiments of the invention may enable determining why something is happening. For example, having found out (using an embodiment of the invention or otherwise) that more callers are dissatisfied, a user may instruct an embodiment to identify or determine why callers are dissatisfied. Accordingly, embodiments of the invention may include or enable an automated discovery of what is happening and why it is happening.

Reference is made to FIG. 5 which shows a screenshot 510 according to illustrative embodiments of the present invention. A process or flown according to some embodiments may include selecting or identifying a category related to a problem. For example, a category related to dissatisfaction and that includes the phrases "dissatisfied", "unhappy" and "disappointed" may be selected by a user. A selected category may be referred to herein as a "base category" or "reference category". For example, as shown by checkbox 530, a user may select a "dissatisfied" category (labeled as "DSAT" in screenshot 510).

In some embodiments, a system and method may suggest a reference or base category to be selected or a system and method may select the reference of base category automatically. For example, a set of categories may be defined and provided to service unit 220, e.g., files including categories (e.g., phrases, categories' names or labels and associations of phrases with categories as described) may be stored in storage system 231 and may be used by service unit 220 as described herein. Service unit 220 may continuously, repeatedly or periodically generate trends of, the set of categories (e.g., once an hour or once a day) and calculate average values base on the trends. Service unit 220 may continuously, repeatedly or periodically calculate interaction or call average values. For example, and as shown by values 550, a percentage and number of calls, per category, may be calculated and presented to a user. For example, by continuously requesting search engine 230 to report the number of calls in the "repeated calls" category (e.g., a category that includes the phrases "I'm calling again" and "I've recently called regarding this") service unit 220 may calculate the percentage and number of calls related associated with the "repeated calls" category and UI unit 210 may present these values as shown by values 550.

For example, service unit 220 may calculate an average of 256 calls per hour related to a specific category (e.g., a category related to a specific product). If service unit 220 discovers, determines or identifies that a trend of the specific category sharply deviates from its average then service unit 220 may suggest that the category be investigated, e.g., if the trend for the specific category indicates that the number of calls goes from 256 calls (or other interactions) an hour to 512 calls an hour then service unit 210 may send a message to UI 210 that may display the name of the category and enable a user to launch an investigation by selecting the category as shown by screenshot 510. Accordingly, an embodiment may automatically inform a user what is happening, e.g., a warning that callers are unhappy with a specific product, e.g., in the form of presenting a category on a screen as described, may tell a supervisor that there is a problem with respect to the product, that a sharp increase in dissatisfaction is detected and so on.

An embodiment may receive a selection of a first and second time periods or intervals. For example, a first time interval selected may be Jan. 25, 2016 until Apr. 24, 2016 and a second time interval may be Apr. 24, 2016 until Apr. 25, 2016, e.g., such selection of time intervals may be made when an administrator notes a suspicious rise in calls of unsatisfied customers in the last day. Typically, although not necessarily, the first time period or interval precedes, or comes before, the second time period or interval, and the first time interval is substantially longer than the second time interval (e.g., in the example above the first time interval is approximately three months and the second time interval is one day). In some embodiments, the first time interval may be preconfigured (e.g., last three or six months). In some embodiments, a system may select the first time interval to be the maximal time interval, e.g., the first time interval is selected based on the time for which recorded interactions exist in storage system 231. Accordingly, a user may not need to select the first time interval. Typically, a user is interested in selecting the second time interval as this is the time period the user wants to investigate. For example, a supervisor, analyst or any other user in a contact center wants to investigate (or understand) what is causing a sharp increase in interactions or calls from dissatisfied users in the last two days and therefore selects the second time interval to be the last two days, leaving it for the system to select the first, preceding time interval (that may be three months back as discussed). For example, a time interval may be selected as shown by boxes 520 that may enable selecting a start and end day, hour, minute and so on. After a category and time intervals are selected a user may click the 540 "Investigate" button and an automated investigation may be performed as described herein. As further described herein, when an automated investigation is completed, a result that includes a cause (or root cause as known in the art) of a problem may be presented to the user as further described herein.

According to some embodiments, an investigation may include calculating a set of correlation differential values for the reference (or selected) category and a set of categories with respect to the first and second time intervals. For example, a set of categories may be defined (e.g., by a user) by selecting a name of a category and providing phrases to be associated with the category. For example, phrase categories named "Repeated calls", "Escalation", "Data query" and "Long calls" as shown in screenshot 510 may be included or defined in a system. For example, long calls may be identified based on metadata of recorded interactions, e.g., the size of a file that includes a recording, a start and end time of a call stored in a database and so on. The set of categories may be stored, e.g., on storage system 231 as described. A set of correlation differential values for the reference category and a set of categories may be calculated by calculating, for each of the categories in the set and the reference category, a correlation differential value as described, e.g., with reference to FIG. 4. Accordingly, a set of correlation differential values for, of, or associated with, a respective set of categories, with respect to a first and second time intervals may be produced.

An embodiment may examine a set of correlation differential values calculated for the reference category and a respective set of categories and may identify or select the category associated with the highest or largest value.

For example, assuming that other than a reference category, three other categories are defined, or exist, in system 200, e.g., categories A, B and C. In such exemplary case, to perform an investigation, having received a selection of a reference category and a selection of a first and second time intervals, an embodiment may calculate the correlation differential values for categories A, B and C with respect to the reference category and the first and second time intervals or periods as described herein. For example, to calculate the correlation differential value for category A, the correlation of category A with the reference category during the first time interval may be calculated using Formula 1 to produce a first correlation value, the correlation of category A with the reference category during the second time interval may be calculated using Formula 1 to produce a second correlation value and the correlation differential value for category A may be calculated by subtracting the first correlation value from the second correlation value. The three correlation differential values may then be examined in order to identify the largest one and the category with the largest correlation differential value may be selected. The category with the largest, greatest or highest correlation differential value may be denoted, marked, or identified as, the candidate phrase category (or simply the candidate category) and the correlation differential value of the candidate phrase category may be denoted, marked, or identified as, the candidate correlation differential value.

In some embodiments, if the candidate correlation differential value is above a threshold then the candidate phrase category and the reference phrase category may be joined or combined to produce a combined category. For example, a threshold may be a value between "−1" and "+1", e.g., 0.89 and, if the candidate correlation differential value is above the threshold (e.g., 0.91 that is greater than 0.89) then the candidate phrase category and the reference category may be joined or combined to produce a combined category (or an updated reference category).

Joining or combining two or more categories to produce a combined category may include defining, creating or generating a new category that includes some or all of the phrases included in the two or more categories. For example, if a first category includes phrases "A" and "B" and a second category includes phrases "B" and "C" then joining or combining the first and second categories may produce a combined category that includes the phrases "A", "B" and "C". Joining, aggregating or combining two or more categories to produce a combined category (e.g., in order to create or generate an updated reference category or a combined category as further described herein) may include selecting phrases from the two or more categories based on any logic, rule or criteria. For example, a combined category created based on first and second categories may include phrases included in the first category or in the second category such that any phrase included in either one of the categories is included in the combined category. In other cases, a combined category created based on first and second categories may include only phrases that are included in both categories such that the combined category is effectively an intersection of phrases included in the first and second categories. Any other logic, rule or criteria may be applied.

The phrases included in a combined phrase category may be presented to a user. For example, a result or output of an investigation may be in the form of a set of phrases that describe a problem. For example, if an administrator of a contact center wants to investigate, or better understand, why more callers are dissatisfied lately then the reference category he or she may select is a category related to dissatisfaction (e.g., a category including the phrases "dissatisfied", "unhappy" and "disappointed" referred to herein as dissatisfied category). Other actions may be taken on categories, or trends, e.g., automatic actions, alerts, etc.

An output of some embodiments may be used in various ways. For example, although identifying problems is mainly described herein, identifying popular or successful products may be just as well achieved by some embodiments. For example, a rise in calls of satisfied customers may be identified, e.g., the same, or in a similar way dissatisfied calls are identified as described. Similarly, the reasons (root cause or root causes) for satisfaction may be identified and presented to a user, e.g., a root cause list may include phrases such as "very satisfied", "great product" and the like. Accordingly, products may be automatically rated. For example, an embodiment may continuously, periodically or iteratively search for specific phrases in recorded interactions as described, find or identify the products that customers are happy with and/or products customers are unhappy with as described and rate, grade or score products based on the level of satisfaction or dissatisfaction, e.g., based on number of happy and unhappy calls as described. Popularity of products and services may be checked over time (e.g., continuously) and trends of popularity may be presented to a user. Accordingly, customer attitudes may be identified by embodiments of the invention and an output of an embodiment may be, or may be used in order to, track popularity or satisfaction with respect to products and services. For example, by generating and using trends and calculating correlation differentials as described, embodiments of the invention may compare and quantify satisfaction (or dissatisfaction) levels for products, may present to a user top products and services based on customers reactions input and so on.

Assuming that the reason for dissatisfaction (and the increase in interactions or calls of dissatisfied customers) is a new product sold or serviced by the contact center, e.g., a dishwasher, the candidate phrase category identified as described herein may be a category that includes phrase related to the dishwasher, e.g., a phrase category that includes the name and/or model of the dishwasher, the name of the manufacturer of the dishwasher and so on. Accordingly, referring to the dishwasher example, the combined phrase category may include, in addition to phrases related to dissatisfaction, phrases that describe the cause of dissatisfaction, e.g., model name of the dishwasher, name of the manufacturer and phrases such as "dirty", "noisy" or other phrase that describe problems with a dishwasher. The advantages of being provided, by an embodiment as described, with both what is happening (e.g., customers are dissatisfied) and why it is happening (e.g., a specific dishwasher is noisy and leaves dishes dirty) are apparent and may be readily appreciated by professionals in the art.

An embodiment may automatically and/or autonomously expand, modify or update phrase categories. For example, an embodiment may identify relevant words and phrases based on a level or value of a correlation of their trend with a trend of a category and selectively, e.g., based on a threshold, add words and phrases to the category. For example, referring to the above dishwasher example and assuming a category related to the dishwasher (referred to as the dishwasher category) initially includes three (3) phrases, e.g., dishwasher, model number and a manufacturer. Possibly (but not necessarily) after the dishwasher category is identified and/or denoted as the candidate phrase category as described above, service unit 220 may search for the most common words or phrases that appear in interactions related to the dishwasher, e.g., using services of search engine 230 as described service unit 220 may identify words or phrase that frequently appear in interactions related to, or associated, with the dishwasher category. Service unit 220 may check or calculate the correlation value of trends of phrases it found with a trend of the dishwasher category and/or with a trend of the dissatisfied category and/or with an interactions trend (a trend of all interactions as described). If a correlation value or level of a phrase (e.g., calculated using Formula 1 as described) is above a threshold then service unit 220 may add the phrase to a category. For example, the words "dirty" and "noisy" may be automatically added to the dishwasher category since they are identified as frequent in, or common to many of the interactions related to the dishwasher. In some embodiments, automatically adding phrases to a category may include verifying a correlation of a trend of the phrase with a trend of the category. For example, after finding a frequent or common phrase as described, a trend for the phrase may be generated as described and a correlation value of the trend may be calculated with respect to a trend of the category and, if the correlation value is above a threshold then the phrase may be added to the category. Accordingly, expanding or updating a category may include identifying candidate phrase (e.g., based on a frequency of their appearance in interactions) and verifying a correlation of the candidate phrases with a category.

Accordingly, words and phrases that a user may not have thought of as belonging (or relevant) to a category may be identified. For example, by identifying or determining a strong correlation (e.g., R=+0.9 in Formula 1) between trends of a first phrase and a second phrase, an embodiment of the invention may identify that the two phrases are related to a common issue or problem. For example, having identified a set of phrases that are related to a common issue or problem, an embodiment may suggest, to a user, to create or define a new category that includes the set of phrases. In other cases, by identifying or determining a strong correlation (e.g., R=+0.92 in Formula 1) between trends of a first phrase that is included in, or associated with, a category of phrases (e.g., the dishwasher category) and a second phrase that is not included in the category, an embodiment of the invention may identify or determine that the second phrase is relevant to the category and may, automatically, add the second phrase to the category. Accordingly, a category may be automatically created, updated or expanded based on a correlation of phrase trends as described.

In some embodiments, scenarios or cases, some of the correlation differential values calculated as described may be negative, e.g., a correlation differential value may be less or smaller than zero (for example, a correlation differential may be −0.67 that is less than zero as in "−0.67<0"). For example, if a first trend is relatively correlated with a second trend during, or over, a first time interval, but uncorrelated with the second trend during, or over, a second (later) time interval then the correlation differential value for the first trend may be negative (e.g., as exemplified by trends 310 in FIG. 3).

In some embodiments, service unit 220 may iterate or repeat over some or even all categories for which the correlation differential value calculated as described is negative and remove recorded interactions associated with the category. Removing interactions or removing recorded interactions as referred to herein may mean, or may include, excluding the removed interactions from further processing. For example, removing interactions may include ignoring the removed interactions when searching for phrases in interactions, generating trends, calculating correlation values, calculating correlation differential values and so on. For example, a black list may be used in order to mark or identify removed interactions and service unit 220 and/or search engine 230 may ignore and/or avoid examining or processing, recorded interactions included in the black list. Using a black list may enable removing interactions from consideration as described and then, e.g., as further described herein, returning, restoring (or un-removing) removed interactions such that returned or restored interactions are treated the way other recorded interactions are treated, e.g., considered, examined and/or processed when searching for phrases in interactions, generating trends, calculating correlation values, calculating correlation differential values and so on. For example, removing an interaction or a recorded interaction may be done by including or inserting the interaction into a black or ignore list and restoring or returning an interaction may include removing the interaction from the black list. Any other method or system may be used in order to remove recorded interactions such that they are ignored when performing methods and operations as described and may further be restored as described. Removing a category as referred to herein may include removing all recorded interactions associated with the category.

After removing a category as described, service unit 220 may calculate (or re-calculate) a candidate phrase category as describe herein to produce an updated candidate correlation. It is noted that an updated candidate correlation may be calculated while ignoring all recorded interactions associated with the removed category.

Reference is made to FIG. 6 which shows exemplary trends according to illustrative embodiments of the present invention. FIG. 6 is presented in order to exemplify the effect of removing a first category on the correlation of a second and third categories. For example, trend 610 may be a trend of the dissatisfied category described above and trends 620 and 630 may be trends of categories related to, or of, two products. In some cases, interactions associated with a first category are also associated with a second category, e.g., if the same phrase is included in the two categories then an interaction that includes the phrases may be associated with both categories. For example, trend 620 may be a trend of a category related to a first, specific smartphone (e.g., of a first manufacturer), and trend 630 may be a trend of a category related to another, second smartphone (e.g., of a different manufacturer), in such case, the word "smartphone" may be included in both categories. In an exemplary case, customers are dissatisfied with the first smartphone but have relatively no problems with the second smartphone, accordingly and as can be seen, trend 630 is relatively uncorrelated with trend 610 and trend 620 is relatively correlated with the dissatisfied trend 610. Since calls related to the second smartphone have an effect on a trend of the first smartphone (since they include the term "smartphone") as well as on the dissatisfied trend, when removing the category of the second smartphone the trends of the problematic smartphone and the dissatisfied calls are highly correlated as seen by trends 640 and 650.

Accordingly, if the candidate phrase category is related to the first smartphone (and represented by, or used for calculating, trend 620) in the above example, after removing the category of the second smartphone (represented by trend 630) and producing new trends 640 and 650 (when ignoring the removed category), an updated candidate correlation value calculated based on trends 640 and 650 may be substantially greater than a candidate correlation value calculated based on trends 610 and 620.

An embodiment may calculate a correlation value for a candidate phrase category with respect to a reference category and, the correlation value is above a threshold then an embodiment may add at least one of the phrases included in the candidate phrase category to the reference category thus producing a combined category (or aggregated or an undated reference category). A process of removing a category or phrase, calculating a correlation value for a candidate phrase and adding phrases to a combined category may be an iterative process, e.g., repeated until all phrases or categories in a list are examined. A combined category, aggregated category and/or an undated reference category may include phrase that describe what is happening and why it is happening. For example, a combined category may include phrase that clearly indicate or explain to a user a reason, cause (or root cause as known in the art) of a problem. A combined category may include a list of root cause phrases, the list of root cause phrases may be updated by including in it phrases of, or included in, a candidate phrase category, e.g., based on a difference between a candidate correlation value and an updated candidate correlation value as described.

For example, with reference to the above dishwasher example, a combined category and/or a list of phrases describing a problem presented to a user may include the dishwasher name, the manufacturer name, the model name of the dishwasher and words such as "dirty" and "noisy", accordingly, a user may readily identify that a rise or increase in calls of dissatisfied customers are related to the specific dishwasher and more specifically, the complaints are that it is noisy and or does not wash dishes as customers expect. Such precise information about a problem, generated, deduced or identified in an automated manner cannot be provided by systems and methods currently known in the art.

In some embodiments, if the difference between the candidate correlation value and the updated candidate correlation value is below a threshold (e.g., below 0.67) then an embodiment may return a phrase category that was removed as described. For example, the category (and its phrases) may be removed or excluded from a black list thus undoing the effect of inserting the category into the black list. As described, removing a category and checking the effect of the removal on a candidate correlation value may be done for some or even all categories for which with a negative correlation differential value was calculated.

In some embodiments, after a combined category is produced as described, the combined category may be used as a reference category and a process or flow may be repeated, for all remaining categories as described. For example, after selecting, from a set of categories, the category with the greatest or highest correlation differential value, removing categories associated with negative correlation values and producing a combined category as described, the remaining set of categories (all categories that were not removed, or that were removed and restored as described) may be processed as described using the combined category as the reference category. For example, assuming a reference category and an initial set of categories A, B, C, D, E and F are processed as described, assuming further that category C was selected as the candidate category and that category F was removed and category C was merged with the reference category, then, in a next iteration, the set of categories A, B, D and E may be processed, e.g., the category with the highest correlation differential value may be selected from the set of categories A, B, D and E and denoted as the candidate category and so on. The process or flow may be repeated until all categories existing, defined or included in a system are either removed or selected as a candidate category.

Reference is made to FIG. 7 that shows a flow according to illustrative embodiments of the present invention. As shown by block 710, a reference category may be identified and/or selected. For example, using values and statistics presented as shown by values 550 in screen 510, a user may select a category for investigation as shown by block 710. As shown by block 715, a selected category may be added to a list of categories. For example, the references or base category described herein may be a list of categories created as shown by block 715. The category list (denoted as CL in FIG. 7) may be similar to, or the same as, a reference or base category described herein, accordingly, the terms "CL" and reference category may be used interchangeably herein. As shown by block 720, a category with a positive correlation differential value may be identified, e.g., as described herein. As shown by block 725, the category with the highest or largest correlation differential value, as calculated with respect to a reference category (or list of categories created as shown by block 715) may be selected. As shown by block 730, the correlation value of, or for the currently processed category (e.g., calculated with respect to a category list that may be the reference category) may be examined and, if the correlation value is above a threshold value (that may be predefined, e.g., by a user) then an intersection of interactions associated with the current category and the list of categories may be performed, e.g., all interactions associated with the reference category and with the currently processed category (denoted in FIG. 7 as Ci) may be associated with the reference category as described herein. As shown by blocks 735 and 740, an intersection of interactions associated with the current category Ci and the reference category (or CL) may be performed (735) such that the current category Ci may be included in, or merged or joined with, the reference category or CL (740). As shown by the arrow connecting blocks 740 and 720, the process may be repeated for another or next category in a list of categories, e.g., as described herein. As shown by block 745, categories for which a negative correlation differential value was determined or calculated may be identified and, as shown by block 750, if removing a category for which a negative correlation differential value was found increases the correlation differential value of the current category Ci then, as shown by block 755, the category may be removed as described (e.g., interactions associated with the removed category may be ignored in subsequent processing or steps). As shown by block 760, all categories with a negative correlation differential value (or for which a negative correlation differential value was calculated) may be removed as described. As shown by block 765, an output of a flow or method may be a set or list of categories, e.g., a set that includes categories (and their phrases) that are relevant to a problem that was investigated and, as described, the set may not include categories that were removed as described, e.g., some of the categories with negative correlation differential.

In some embodiment, after a set of relevant phrase categories were identified and/or isolated, further or additional investigation may be performed. For example, generally referring to identifying and/or isolating phrase categories as determining, understanding and/or indicating "what is happening", identifying, within the identified and/or isolated categories, the most relevant phrases may be the "why is it happening" part of an investigation. In some embodiments, in order to determine how relevant a phrase is to a problem or issue that is investigated, the correlation of trend of the phrase with a trend of a category or list of categories. For example, a correlation differential value may be calculated for each of the phrases in a combined category (or an updated reference category) created, produced or generated as described herein. For example, a trend of, or for, each of the phrases in a combined category (or an updated reference category) may be generated as described herein, a trend of, or for, a combined category (or an updated reference category) may be generated as described herein and a correlation differential may be calculated for the phrase, with respect to a first and second time intervals (e.g., as selected by a user when requesting an investigation, for example, as shown by selection boxes 520 in screenshot 510).

For each phrase, included in the updated reference category, a correlation differential may be calculated with respect to the updated reference category. For example, if the phrase does not represent a new issue then the correlation differential calculated for the phrase with respect to the updated reference category may be below a threshold. Accordingly, to determine if a phrase is related to a new issue (e.g., one being investigated, for example, unhappy or dissatisfied callers), the correlation differential of, or for, the phrase may be calculated and, if the correlation differential value is below a threshold then the phrase may be considered is irrelevant and may be ignored in further or subsequent processing. For example, if a correlation differential value of a phrase is negative (or below zero) then interactions associated with the phrase may be removed, e.g., ignored in further processing as described.

In order to ascertain or verify that a contribution of a phrase to an investigation is not the same as the contribution of the category that includes the phrase, a correlation and/or a correlation differential of the phrase, with respect to each of the categories in the updated reference category may be calculated. If a value of a correlation and/or a correlation differential value of a phrase, calculated with respect to at least one category included in the updated reference category is above a threshold then the phrase may be removed (e.g., by removing all interactions associated with the phrase as described).

In order to ascertain or verify that a phrase is unrelated to an old or known issue, e.g., an issue or matter unrelated to a problem being investigated, a correlation of a trend of the phrase may be calculated with respect to an interaction trend. For example, if it is found that the phrase appears, or is mentioned or uttered in most interactions then it may be assumed that the trend is irrelevant to a problem being investigated and the phrase may be removed. For example, as described herein, phrases such as "good bye" may appear in many, or most of the, interactions but contribute little to an investigation or a definition or indication of a cause of a problem. Accordingly, in some embodiments, if a correlation of a trend of phrase with the trend of all interactions is high then the phrase may be considered old, irrelevant and may be ignored, e.g., as described. In some embodiments, all phrases in an updated reference category may be put through the tests of: does a trend of the phrase, in a specific time interval (e.g., a second time interval as described herein) correlate with a trend of an updated reference category? (for example, by calculating a correlation value as described), is the phrase related to a new issue? (for example, by calculating a differential correlation value with respect to all interactions as described), is the phrase uncorrelated to an investigated problem? (for example, by identifying that a correlation value for a phrase, with respect to an updated reference category is below a threshold as described), is the phrase simply a common phrase mentioned in a specific category? (for example, has a higher correlation to a single category to that of a combined or reference category as described). Phrases that pass these tests or criteria may be included in a set of phrase presented to a user, e.g., a set of phrases that indicate a root cause of a problem.

Figure 8:
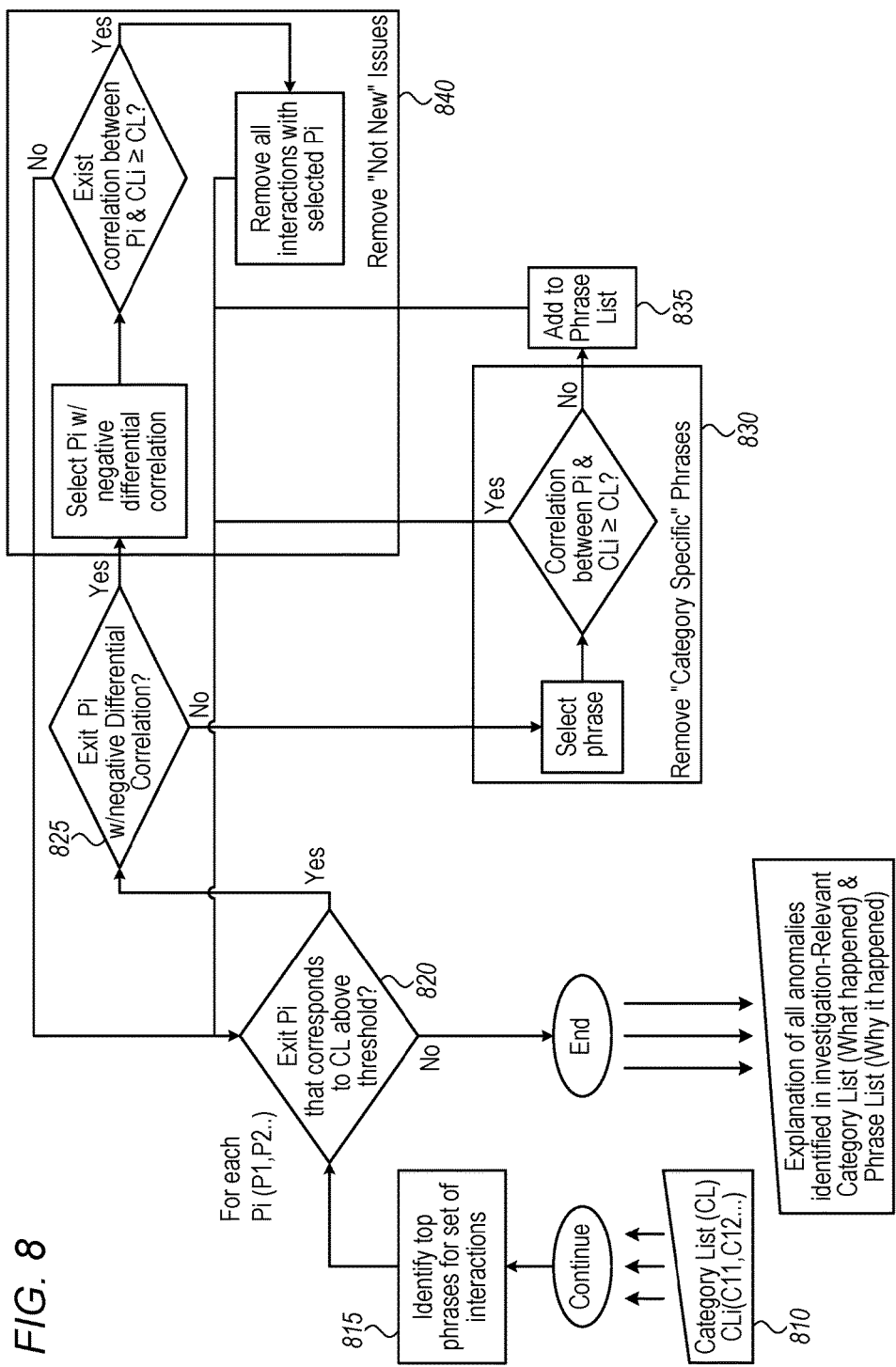
FIG. 8 shows a flow according to illustrative embodiments of the present invention.

Reference is made to FIG. 8 that shows a flow according to illustrative embodiments of the present invention. As shown by block 810, a list of phrase categories may be provided, or used, as input to a flow. For example, an updated reference category produced or created as described herein may be used as input to a flow. As shown by block 815, top phrases may be identified, e.g., a top phrase may be identified by calculating a correlation value for a phrase as shown by block 820 and described herein. Accordingly, the top phrases, e.g., the phrases that are most relevant to a problem may be identified based on their correlation with a category of phrases (e.g., the combined category described herein) that where already identified as the most relevant phrases. As shown by block 825, an embodiment may check whether or not a phrase with a negative correlation value (as calculated with respect to the updated reference category) exists in the set of phrases provided as input, e.g., as shown by block 810. As shown by block 840, phrases related to old issues (e.g., issues that are not directly or necessarily related to the issue being investigated) may be removed, e.g., by removing from further consideration or processing all recorded interactions associated with these phrases. As shown by block 830, if a negative correlation value is not identified then the phrase may be selected and a test may be made in order to verify the phrase is not highly correlated with any of the categories in a system. As shown by block 835, if the correlation of the phrase with its category is below a threshold then the phrase may be added to a list of phrases that may be presented to a user as described.

Figure 9:
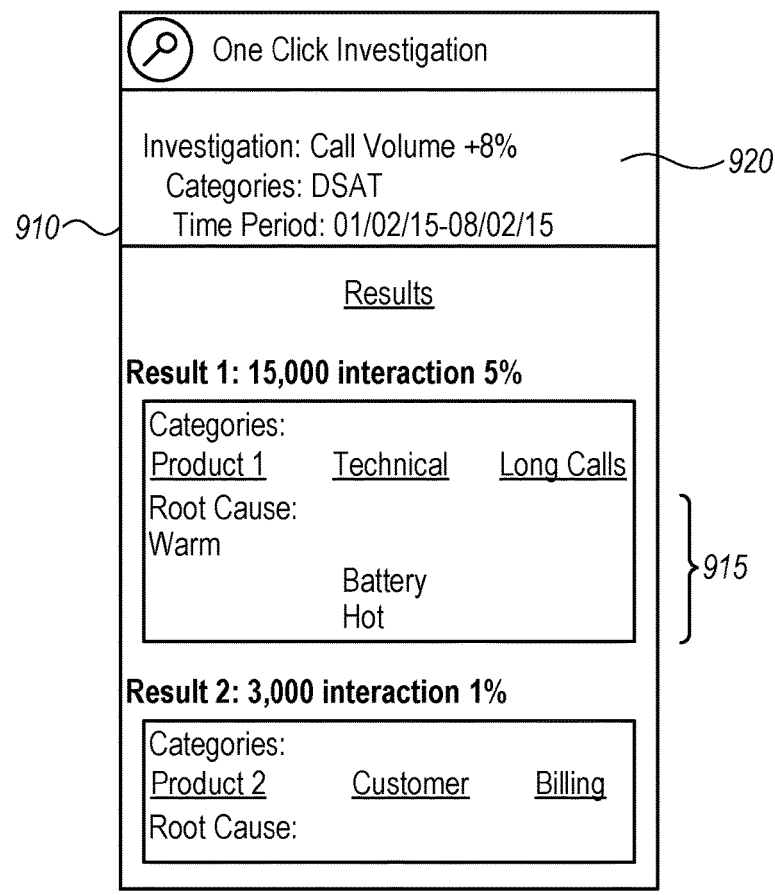
FIG. 9 shows a screenshot according to illustrative embodiments of the present invention.

Reference is made to FIG. 9 that shows a screenshot according to illustrative embodiments of the present invention. As shown, screenshot 910 may include a set or list of phrases 915 that may indicate or specify a root cause of a problem. For example, as shown by text lines 920, a user may have selected to investigate calls of dissatisfied customers by selecting the "DSAT" category as the base or initial reference category and the user may have selected to specifically look at the time interval Jan. 2, 2015-Aug. 2, 2015 (Feb. 1, 2015 to Feb. 8, 2015). Assuming most of the dissatisfied calls were related to a smartphone, as shown. phrases 915 specifically indicate to the user that the problems with the smartphone are related to the battery, and heating.

Accordingly, and as described herein, an embodiment may automatically identify a problematic product or service, generate a list of phrases that best describe the problem and may present to a user the list of phrases that specifies the problem. As described, UI unit 210 may receive, from a user, a selection of a problem, issue, phrase or phrase category, cause a system to identify interactions related to the problem, issue, phrase or phrase category and provide the user with information such as a list of interactions related to the problem, a number of interactions related to the problem, a list of phrase categories related to the problem and a list of phrases related to, or specifically describing the problem.

For example, service unit 220 may receive, from UI unit 210, a phrase or category related to a problem (e.g., one that a user wants to investigate) and return, to UI unit 210, a list of phrases that best describes a root cause of the problem. For example, a list of phrases that describes a root cause of a problem may be a name of a product (e.g., a specific name and model of a car or smartphone) and a specific problem customers are having with the product (e.g., short battery life in the smartphone or high fuel consumption of the car). Accordingly, and as further described herein, a system and method according to some embodiments may enable and/or provide a one-click full investigation of a problem or issue. For example, in response to a single selection of a problem e.g., by selecting a phrase or category of phrases such as "dissatisfied" and/or "unhappy with", an embodiment may provide a list of phrases that specifically describe why customers are dissatisfied or unhappy, e.g., the list of phrases may specify or indicate the problematic products or services causing customers dissatisfaction and, moreover, the list of phrases may specifically describe what exactly, in the problematic products, causes the problem.

Therefore, and as described herein, embodiments of the invention may greatly improve the technology of information analysis or data analysis by providing a detailed, accurate investigation that is performed automatically, in response to a selection of a problem and a single click of a button. Specifically, using trend correlations and correlation differentials as described enable embodiments of the invention to provide results that current or known systems and methods are unable to produce or provide. For example, and as described, a system and method according to some embodiments may provide an automated way of identifying a rise or increase in complaints (e.g., complaints about a specific smartphone) and further determine that a majority of the complaints are related to a specific issue or problem (e.g., related to the battery of the smartphone).

Figure 10:
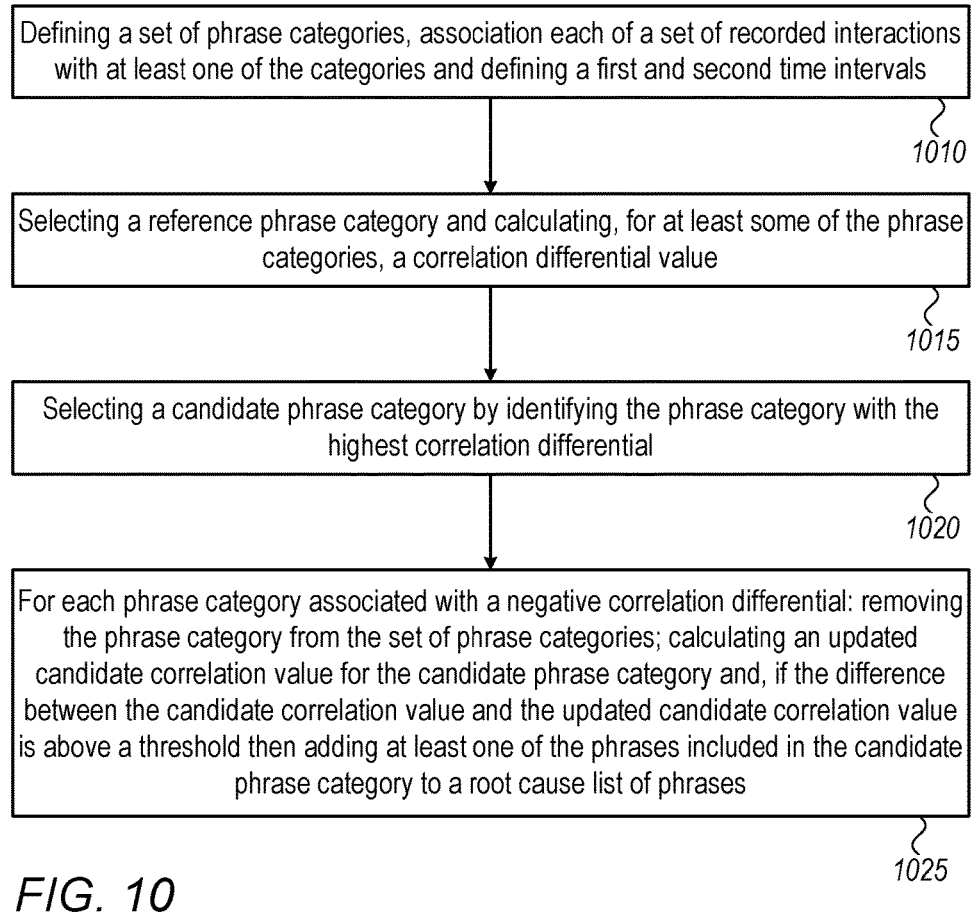
FIG. 10 shows a flow according to illustrative embodiments of the present invention.

Reference is made to FIG. 10 which shows a method according to illustrative embodiments of the present invention. As shown by block 1010, a set of phrase categories may be defined, a set of recorded interactions may each be associated with at least one phrase category and a first and second time intervals may be defined. For example, phrase categories may be defined and/or selected and recorded interactions may be associated with categories as described herein. First and second time intervals or periods may be selected by a user as described herein, e.g., using a screen as shown in screenshot 510.

As shown by block 1015, a reference phrase category may be selected, e.g., automatically as described or based on input from a user, and a correlation differential value may be calculated for at least some of the phrase categories. For example, calculating a correlation differential value may include calculating, for the first time interval, a first correlation value for the phrase category and the reference phrase category, wherein the first correlation value represents the correlation of a trend of the phrase category with a trend of the reference phrase category. As described, a trend of a phrase category may be, or be defined by, a set of values representing the number of recorded interactions, in a respective set of time units, that are associated with the phrase category. Calculating a correlation differential value may further include calculating, for the second time interval, a second correlation for the phrase category and the reference phrase category, and calculating the correlation differential of the phrase category by relating the first correlation value to the second correlation value. For example, a correlation differential value may be calculated by subtracting the second correlation value (calculated for the second time interval) from the first correlation value (calculated for the first time interval) as described herein.

As shown by block 1020, the category for which the highest correlation differential was calculated may be selected as a candidate phrase category.

As shown by block 1025, for each phrase category associated with a negative correlation differential, the phrase category may be removed from the set of phrase categories; an updated candidate correlation value may be calculated for the candidate phrase category and, if the difference between the candidate correlation value and the updated candidate correlation value is above a threshold then at least one of the phrases included in the candidate phrase category may be added to a root cause list of phrases.

For example, and as described, service unit 220 may iterate over all phrase categories for which a negative correlation differential value was calculated or found and, for each of these categories, service unit may remove the phrase category from the set of phrase categories (e.g., by removing recorded interactions associated with the phrase category from the set of recorded interactions); calculate an updated candidate correlation value for the candidate phrase category and the reference phrase category, and, if an improvement in correlation is observed, e.g., if the difference between the candidate correlation value and the updated candidate correlation value is above a threshold, then service unit 220 may add at least one of the phrases included in the candidate phrase category to a root cause list of phrases, e.g., some, or event all of, the phrases in the candidate phrase category may be added to the reference category thus producing an updated reference category as described.

As described, if the difference between the candidate correlation value and the updated candidate correlation value (e.g., calculated as shown by block 1025) is below a threshold then an embodiment may return the phrase category to the set of phrase categories, e.g., by returning the recorded interactions that were previously removed to the set of recorded interactions. The process or flow may then examine the next phrase category with a negative correlation differential value until all such categories are examined and processed as described.

In some embodiments, selecting the candidate phrase category includes identifying the phrase category with the highest correlation differential value whose trend changed, in the second time interval with respect to the first time interval, in the same direction of a change of the trend of the reference phrase category. For example, since a correlation differential value may be calculated by subtracting a first correlation value from a second one, in some cases, a high or large correlation differential value may be identified for a category whose trend sharply went down while the trend of the reference category went up. In such case, although during the second time interval, the trend of the category came closer to the trend of the reference category (with respect to the first time interval), since the trends are changing in opposite directions, the category may not be the one to be selected for further processing as described. By selecting a category whose trend came closer to the trend of the reference category (thus increasing its correlation with the trend of the reference category) and, in addition, the category's trend shows a change in the same direction of change of the trend of the reference category, an embodiment may make sure that the category selected as the candidate category is indeed relevant to an issue or problem related to the reference category, e.g., the issue or problem being investigated by selecting the reference category as described.

As described, if the correlation differential value of, or calculated for. the reference phrase category and the candidate phrase category is above a threshold then a combined phrase category by may be produced. For example, service unit 220 may create a combined category by combining, joining or aggregating a candidate phrase category and a reference phrase category by creating a category that includes all phrases in the candidate phrase category and the reference phrase category. Service unit 220 may denote, or use as described, the combined phrase category as the updated reference phrase category and may subsequently perform steps or operations described with respect to a reference phrase category using the updated reference phrase category.

Verifying that each phrase in a category (e.g., in an updated reference category or in a combined phrase category) is indeed relevant to a problem may include, as described, generating a trend for the phase a trend for the combined phrase category, determining a correlation level of the trends by relating the phrase trend to the combined phrase category trend, and, if the correlation level is greater than a threshold level then the phrase may be included in a root cause list of phrases that may be presented to a user, e.g., as shown by screenshot 910.

For example, a root cause list of phrases may include phrases that describe or explain a problem. For example, a root cause list of phrases related to a car may include phrases such as "fuel consumption", "refill often", "gas mileage" and "fuel prices" thus enabling a user to readily understand that callers are complaining about fuel consumption of the car.

To verify or ascertain that a phrase contributes more insight than already contributed by the category in which it is included, an embodiment may examine each phrase in a category and if a correlation of a trend of the phrase with a trend of the category including it is greater than the correlation of the trend of the phrase with a trend of the trend of a combined phrase category then an embodiment may remove the phrase from both its category and the combined phrase category thus ignoring the phrase in further processing or examination as described. Accordingly, embodiments of the invention may only provide, or present to a user, phrases that indeed reflect, indicate, or point to, a problem and not any phrase that is frequently or otherwise mentioned in calls or interactions.

In some embodiments, phrases in a root cause list may be checked against a combined phrase category produced as described. For example, for each phrase in a list of phrases, service unit 220 may calculate a phrase correlation differential based on a trend of the phrase and a trend of the combined phrase category; and if the correlation differential is less than a threshold level (e.g., less than 0.79) then service unit 220 may remove the phrase from the root cause list of phrases. Service unit 220 may check or verify as described, all phrases, e.g., by iteratively selecting all of the phrases in the combined phrase category, calculating their correlation differential value and removing them if their correlation differential value does not meet a criterion as described.

Information presented to a user may include a list of interactions, a number of interactions, a list of related categories and a list of related phrases. For example, with respect to a selected reference phrase category, e.g., one related to a smartphone, data presented to a user may include "939 calls related to the smartphone, 678 related to battery" and so on, e.g., as shown by screenshot 510 and described herein. A list of hottest or most relevant phrases may be presented, e.g., by presenting phrases in a combined category, possibly after verifying each of the phrases as described.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method of analyzing recorded interactions, the method comprising, using one or more computer processors:

selecting a reference phrase category based on input from a user via a computer user interface;

associating by a processor of the one or more processors each of a set of recorded interactions with at least one phrase category included in a set of phrase categories stored in a database, wherein a recorded interaction is associated with a phrase category if a text of the recorded interaction includes at least one phrase included in the phrase category and wherein each phrase category includes one or more phrases, each recorded interaction stored in the database and associated with text produced by applying a speech-to-text process to an audio recording or a video recording of the recorded interaction;

receiving a selection of a first time interval, and from a user via a computer user interface a selection of a second time interval, the first time interval preceding the second time interval;

a. calculating, by a processor of the one or more processors, for each of at least some of the phrase categories in the set of phrase categories a correlation differential by:

calculating, for the first time interval, a first correlation value for the phrase category and the reference phrase category, the first correlation value representing the correlation of a trend of the phrase category with a trend of the reference phrase category, wherein a trend of a phrase category is defined by a set of values representing the number of recorded interactions, in a respective set of time units, that are associated with the phrase category;

calculating, for the second time interval, a second correlation value for the phrase category and the reference phrase category, and calculating the correlation differential of the phrase category by subtracting the second correlation value from the first correlation value;

b. selecting, by a processor of the one or more processors, a candidate phrase category by identifying the phrase category with the highest correlation differential and denoting the correlation differential of the candidate phrase category as the candidate correlation differential;

adding, by a processor of the one or more processors, at least one of the phrases included in the candidate phrase category to a root cause list of phrases;

using a search engine executed by a processor of the one or more processors, determining a number of interactions including a phrase from the root cause list of phrases; and displaying to the user via the computer user interface the root cause list of phrases and the number of interactions.

2. The method of claim 1, comprising selecting the candidate phrase category by identifying the phrase category with the highest correlation differential value and whose trend changed, in the second time interval with respect to the first time interval, in the same direction of a change of the trend of the reference phrase category.

3. The method of claim 1, comprising:
c. for each phrase category with a negative correlation differential:
    removing the phrase category from the set of phrase categories by removing recorded interactions associated with the phrase category from the set of recorded interactions;
    calculating an updated candidate correlation value for the candidate phrase category and the reference phrase category, and
    if the difference between the candidate correlation value and the updated candidate correlation value is below a threshold then returning the phrase category to the set of phrase categories by returning the recorded interactions that were removed at step (a) to the set of recorded interactions; and
    if the difference between the candidate correlation value and the updated candidate correlation value is above a threshold then adding at least one of the phrases included in the candidate phrase category to the root cause list of phrases.

4. The method of claim 3, comprising:
if the correlation differential value of the reference phrase category and the candidate phrase category is above a threshold then producing a combined phrase category by combining the candidate phrase category and the reference phrase category, denoting the combined phrase category as the reference phrase category and repeating steps b and c.

5. The method of claim 4, comprising:
selecting a phrase from the combined phrase category;
generating a phrase trend for the phrase based on the number of recorded interactions, in the set of recorded interactions, that include the phrase, per time unit, during the second time interval;
generating a combined phrase category trend for the combined phrase category;
determining a correlation level by relating the phrase trend to the combined phrase category trend; and
if the correlation level is greater than a threshold level then including the phrase in the root cause list of phrases and providing the list to a user.

6. The method of claim 4, comprising:
for each phrase category in the combined phrase category:
    for each phrase in the category:
        if a correlation of the phrase trend of the phrase with a trend of the phrase category is greater than the correlation of the phrase trend with a trend of the combined phrase category then removing the phrase category from the combined phrase category.

7. The method of claim 5, comprising:
for at least one phrase included in in the root cause list of phrases:
    calculating a phrase correlation differential based on a trend of the phrase and a trend of the combined phrase category; and
    if the correlation differential is less than a threshold level then removing the phrase from the root cause list of phrases.

8. The method of claim 5, comprising iteratively selecting all of the phrases in the combined phrase category.

9. The method of claim 1, comprising:
providing, with respect to the input related to the reference phrase category, at least one of: a list of interactions, a number of interactions, a list of related categories and a list of related phrases.

10. The method of claim 1, wherein a recorded interaction is associated with a phrase category if at least one phrase included in the phrase category is included in the recorded interaction.

11. The method of claim 1, wherein a recorded interaction is associated with a phrase category based on metadata related to the recorded interaction.

12. A computer-implemented method of automated identification of a cause of a problem, the method comprising, using one or more computer processors:
selecting a reference phrase category based on input from a user via a computer user interface;
associating by a processor of the one or more processors each of a set of recorded interactions with at least one phrase category stored in a database, wherein the at least one phrase category includes one or more phrases and wherein a recorded interaction is associated with a phrase category if the a text of the recorded interaction includes at least one phrase included in the phrase category, each recorded interaction stored in the database and associated with text produced by applying a speech-to-text process to an audio recording or a video recording of the recorded interaction;

selecting a base phrase category;

calculating by a processor of the one or more processors, for each of at least some phrase categories in a set of phrase categories a correlation differential by:

calculating, for a first time interval, a first correlation level for the phrase category and the base phrase category, the first correlation level quantifying the correlation level of a trend of the phrase category with a trend of the reference phrase category, wherein a trend wherein a trend includes values over time;

calculating, for a second time interval, a second correlation level for the phrase category and the reference phrase category, and calculating the correlation differential of the phrase category by comparing the first correlation level and the second correlation level;

selecting by a processor of the one or more processors a candidate phrase category by identifying, in the set of categories, the phrase category with the largest correlation differential and denoting the correlation differential of the candidate phrase category as the candidate correlation differential;

for each phrase category for which a negative correlation differential was calculated:

removing by a processor of the one or more processors the phrase category from the set of phrase categories;

calculating an updated candidate correlation level for the candidate phrase category and the reference phrase category, and if the difference between the candidate correlation level and the updated candidate correlation level is below a threshold then returning the phrase category to the set of phrase categories; and if the difference between the candidate correlation level and the updated candidate correlation level is above a threshold then adding at least one of the phrases included in the candidate phrase category to a root cause list of phrases;

using a search engine executed by a processor of the one or more processors, determining a number of interactions including a phrase from the root cause list of phrases; and displaying to the user via the computer user interface the root cause list of phrases and the number of interactions.

13. A system comprising:

a memory; and a controller configured to:

define a set of phrase categories by including one or more phrases in each of the phrase categories, the phrase categories stored in a database;

associate each of a set of recorded interactions with at least one phrase category in the set of phrase categories, wherein a recorded interaction is associated with a phrase category if the recorded interaction includes at least one phrase included in the phrase category, each recorded interaction stored in the database and associated with text produced by applying a speech-to-text process to an audio recording or a video recording of the recorded interaction;

receive a selection of a first time interval and from a user via a computer user interface a selection of a second time interval, the first time interval preceding the second time interval;

select a reference phrase category based on input from a user via a computer user interface;

a. calculate, for each of at least some of the phrase categories in the set of phrase categories a correlation differential by:

calculating, for the first time interval, a first correlation value for the phrase category and the reference phrase category, the first correlation value representing the correlation of a trend of the phrase category with a trend of the reference phrase category, wherein a trend wherein a trend includes values over time;

calculating, for the second time interval, a second correlation value for the phrase category and the reference phrase category, and calculating the correlation differential of the phrase category by subtracting the second correlation value from the first correlation value;

b. select a candidate phrase category by identifying the phrase category with the highest correlation differential and denoting the correlation differential of the candidate phrase category as the candidate correlation differential; and add at least one of the phrases included in the candidate phrase category to a root cause list of phrases;

use a search engine to determine a number of interactions including a phrase from the root cause list of phrases; and display to the user via the computer user interface the root cause list of phrases and the number of interactions.

14. The system of claim 13, wherein the controller is further configured to select the candidate phrase category by identifying the phrase category with the highest correlation differential value and whose trend changed, in the second time interval with respect to the first time interval, in the same direction of a change of the trend of the reference phrase category.

15. The system of claim 13, wherein the controller is further configured to:

c. for each phrase category with a negative correlation differential:

remove the phrase category from the set of phrase categories by removing recorded interactions associated with the phrase category from the set of recorded interactions;

calculate an updated candidate correlation value for the candidate phrase category and the reference phrase category, and if the difference between the candidate correlation value and the updated candidate correlation value is below a threshold then return the phrase category to the set of phrase categories by returning the recorded interactions that were removed at step (a) to the set of recorded interactions; and if the difference between the candidate correlation value and the updated candidate correlation value is above a threshold then add at least one of the phrases included in the candidate phrase category to the root cause list of phrases.

16. The system of claim 15, wherein the controller is further configured to, if the correlation differential value of the reference phrase category and the candidate phrase category is above a threshold then produce a combined phrase category by combining the candidate phrase category and the reference phrase category, denoting the combined phrase category as the reference phrase category and repeating steps b and c.

17. The system of claim 14, wherein the controller is further configured to:
select a phrase from the combined phrase category;
generate a phrase trend for the phrase based on the number of recorded interactions, in the set of recorded interactions, that include the phrase, per time unit, during the second time interval;
generate a combined phrase category trend for the combined phrase category;
determine a correlation level by relating the phrase trend to the combined phrase category trend; and
if the correlation level is greater than a threshold level then include the phrase in a root cause list of phrases and provide the list to a user.

18. The system of claim 16, wherein the controller is further configured to:
for each phrase category in the combined phrase category:
for each phrase in the category:
if a correlation of the phrase trend of the phrase with a trend of the phrase category is greater than the correlation of the phrase trend with a trend of the combined phrase category then remove the phrase category from the combined phrase category.

19. The system of claim 15, wherein the controller is further configured to:
for at least one phrase included in in the root cause list of phrases:
calculate a phrase correlation differential based on a trend of the phrase and a trend of the combined phrase category; and
if the correlation differential is less than a threshold level then remove the phrase from the root cause list of phrases.

20. The system of claim 16, wherein the controller is further configured to iteratively select all of the phrases in the combined phrase category.

21. The system of claim 13, wherein the controller is further configured to:
select the reference phrase category based on input from a user; and
provide, with respect to the input, at least one of: a list of interactions, a number of interactions, a list of related categories and a list of related phrases.

* * * * *